Jan. 9, 1962 U. ELTZE 3,016,247
CURVE STABILIZATION ARRANGEMENT, PARTICULARLY
FOR MOTOR VEHICLES
Filed March 11, 1958 2 Sheets-Sheet 1

INVENTOR.
ULRICH ELTZE
BY Dicke and Craig
ATTORNEYS

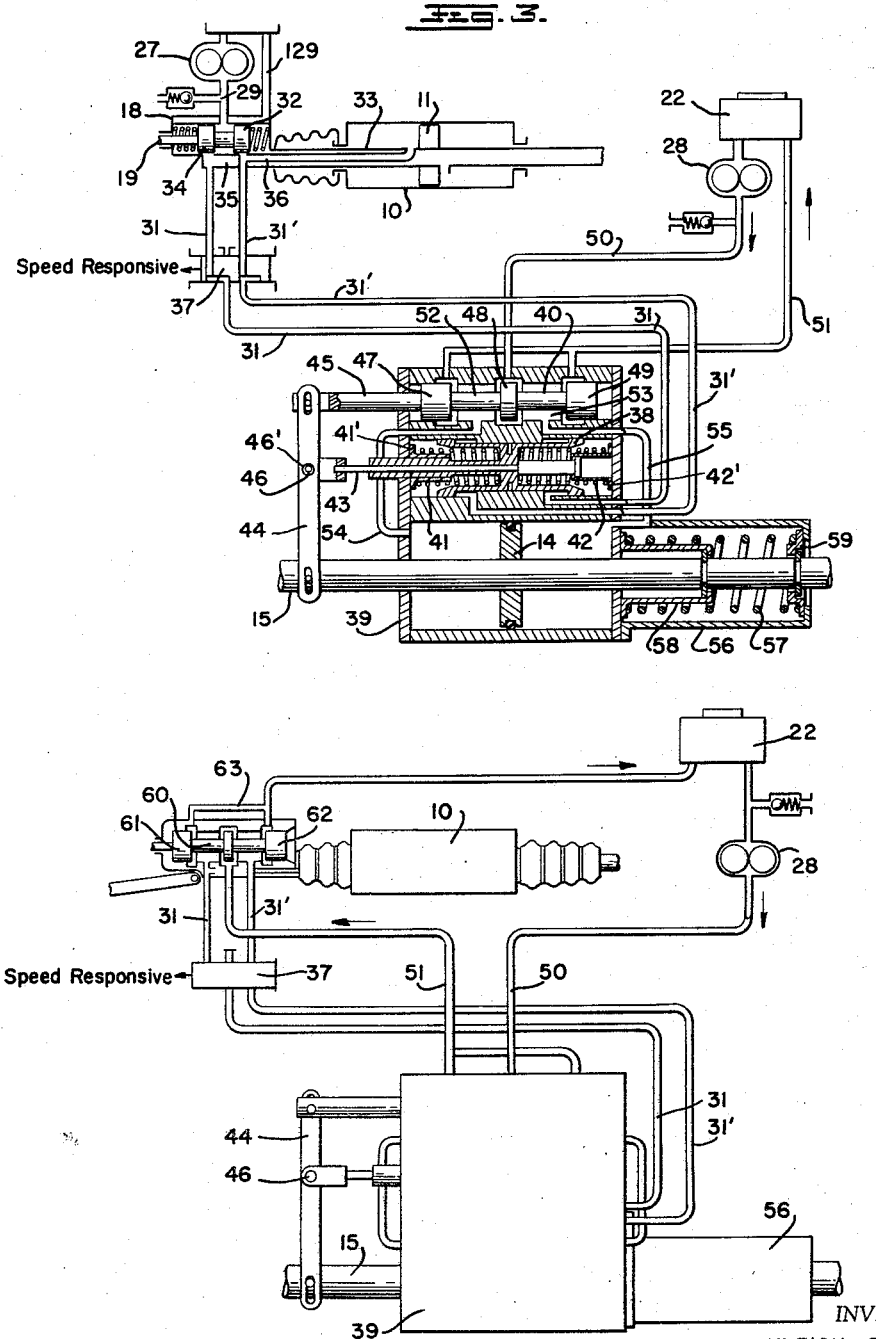

United States Patent Office 3,016,247
Patented Jan. 9, 1962

3,016,247
CURVE STABILIZATION ARRANGEMENT, PARTICULARLY FOR MOTOR VEHICLES
Ulrich Eltze, Stuttgart-Riedenberg, Germany, assignor to Daimler-Benz Aktiengesellschaft, Stuttgart-Unterturkheim, Germany
Filed Mar. 11, 1958, Ser. No. 720,729
Claims priority, application Germany Mar. 15, 1957
7 Claims. (Cl. 280—112)

The present invention relates to an installation for the curve stabilization, especially in motor vehicles, provided with an actuating member controlled by means of an auxiliary or servo force for the steering system and with a further actuating member for the adjustment of a tilting or inclination spring system also controlled by means of an auxiliary force by the steering wheel.

It has already been proposed in the prior art to connect a servo steering mechanism with a tilting spring system effecting the vehicle inclination in such a manner that during passage or traversal of a curve the pressure serving for purposes of control of the servo steering mechanism simultaneously loads the piston of an adjusting member for the inclination or tilting spring system so that the spring disposed on the outside of the curve is more strongly pre-stressed or pre-tensioned.

However, such an arrangement as proposed in the prior art has, inter alia, the disadvantage that only the same pressure always acts on the piston for the actuation of the inclination or tilting spring system as prevails in the servo steering mechanism. Since this pressure has its maximum during standstill of the vehicle and becomes relatively small during travel, the piston for the spring control system, together with its cylinder, has to be constructed excessively large to operate properly also with the smaller pressures which may occur.

The present invention proposes a curve stabilization installation which remedies the inadequacies existing in the prior art devices in such a way that the adjustment of the inclination or tilting spring system is only controlled by the servo steering mechanism but that the spring system is actuated with a pressure of its own.

The problem of the prior art devices is solved in accordance with the present invention in that both actuating members are interconnected in mutually independent auxiliary force circuits or in auxiliary force circuits which are independently adjustable from each other and in that the auxiliary force circuit for the actuating member of the inclination spring system is controllable by the auxiliary force circuit for the actuating member of the steering mechanism.

The construction according to the present invention offers the advantage that it is possible to operate with different pressures for the steering mechanism and the inclination or tilting spring system. This is advantageous because the piston and cylinder for the actuation of the inclination spring system may be made correspondingly small.

Furthermore, it is made possible by construction in accordance with the present invention to let the inclination spring system become responsive or operative only with a predetermined pressure or to impart different characteristics to the two actuating systems.

In a construction according to the present invention, a common source of power may be used for supplying both auxiliary force circuits whereby the circuit for the inclination spring system is branched off from the output of the source of power ahead of the inlet for the auxiliary force into the control member for the servo steering system.

According to another embodiment in accordance with the present invention, two mutually independent and separate sources of powers are proposed for purposes of supplying respective ones of the two auxiliary force circuits.

However, it is also possible in accordance with the present invention to connect both auxiliary force circuits in series behind each other and to regulate each independently of the other though supplied from a common source.

It may also be appropriate in a system according to the present invention to insert into the connection between the control member for the auxiliary force circuit of the inclined spring system and the auxiliary force circuit for the steering mechanism a throttling or blocking member, such as a valve, which may be actuated either selectively or automatically. It is thereby possible to achieve an ajustment of the inclination spring system which becomes effective only with a predetermined vehicle speed. The auxiliary force may advantageously be effective hydraulically, for example, by oil pressure.

In a construction according to the present invention with a hydraulic auxiliary force, for example, by means of oil pressure, the control means for the working piston of the inclination or tilting spring system may be constructed appropriately as a throttle control means though it is also possible to supply both circuits with a constant input pressure from a common pump. In connection therewith, the actuating member for the adjustment of the inclination spring system may be constructed as a double-acting working piston with which are connected two control slide valve members by means of a scale-beam like intermediate linkage.

Accordingly, it is an object of the present invention to provide a system for automatically controlling the spring system determining the inclination of the vehicle by the steering system of the vehicle though enabling a control of the pressure of the auxiliary force for each of the two systems independently of each other.

Another object of the present invention resides in the provision of an arrangement for the control of a curve stabilization arrangement for motor vehicles in which the steering movement controls the servo steering mechanism, the pressure of which in turn controls the curve stabilization spring system which utilizes its own pressure for purposes of actuation thereof.

Another object of the present invention resides in the provision of a compact control arrangement for a curve stabilization installation, especially for motor vehicles, in which all the parts may be made relatively small and in which the control system is relatively simple.

Another object of the present invention resides in the provision of a control system for both the servo steering mechanism and the spring system determining the vehicle inclination in which the latter may be actuated by a pressure independently controlled of the pressure prevailing in the servo steering mechanism.

These and other objects, features and advantages of the present invention will become more obvious from the following description when taken in connection with the accompanying drawing which shows, for purposes of illustration only, several embodiments in accordance with the present invention, and wherein.

Figure 2:
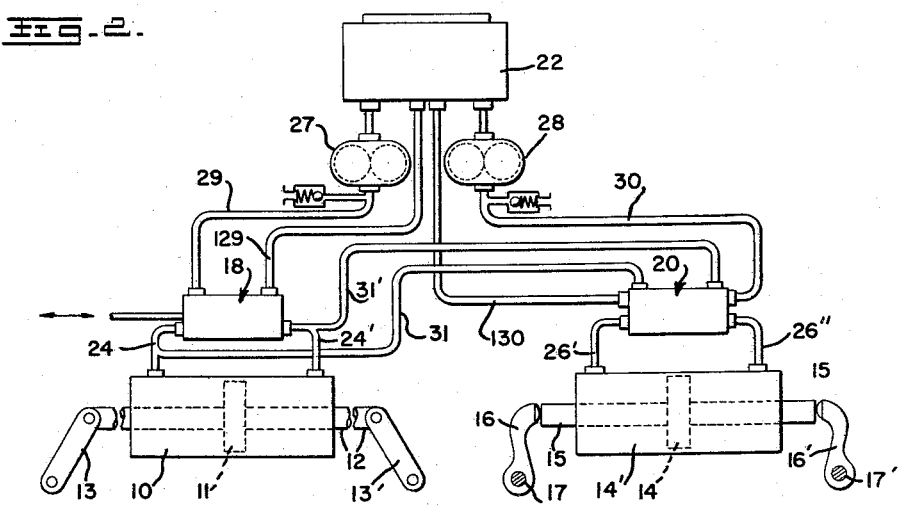
FIGURE 2 is a schematic arrangement, similar to that of FIGURE 1, of a second embodiment of a control system in accordance with the present invention for the auxiliary force circuits of the servo steering mechanism and servo spring system.

FIGURE 3 is a somewhat schematic control arrangement, similar to FIGURE 2, and provided with a throttle control arrangement for the actuation of the inclination spring system, certain parts being shown in cross section to indicate the details thereof; and FIGURE 4 is a schematic control arrangement, similar to FIGURE 3, of a control system in which two auxiliary force circuits are connected in series behind each other and which are controllable independently of each other.

Figure 1:
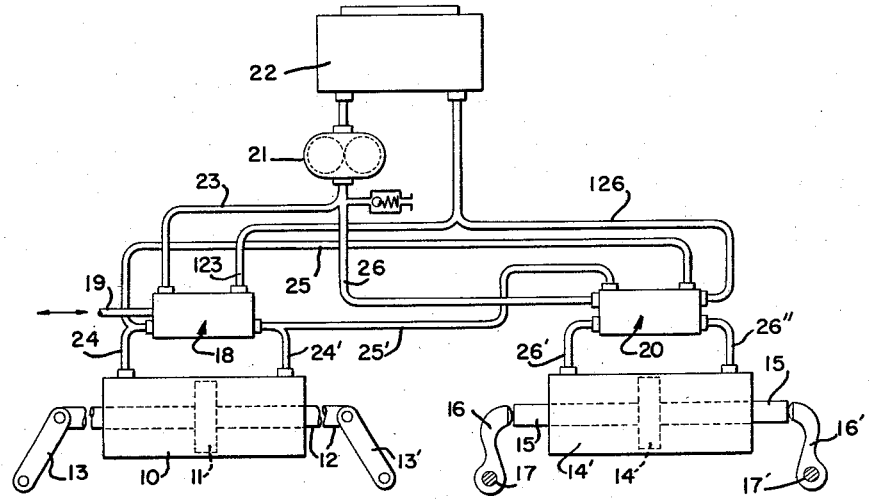
FIGURE 1 is a schematic arrangement of a first embodiment of a control system in accordance with the present invention for the auxiliary force circuits of the servo steering mechanism and servo spring system.

Referring now to the drawing, wherein like reference numerals are used throughout the various views to designate like parts, and more particularly to FIGURE 1, reference numeral 10 designates a working cylinder for the actuation of the servo steering system which is controlled by a hydraulic servo system. The piston 11 which is adapted to reciprocate within the cylinder 10 is connected with the steering links or arms 13 and 13' of any suitable construction.

A further hydraulic working piston 14 which is disposed in a corresponding working cylinder 14' serves for purposes of adjusting the inclination or tilting spring system whereby the piston 14 depending on the movement thereof pre-tensions with the piston rod 15 thereof the torsion rod springs 17 or 17' over arms or levers 16 and 16'.

A control valve generally designated by reference numeral 18 is provided for purposes of controlling the auxiliary force for the servo steering mechanism. The control valve 18 is controlled by means of a linkage 19 or the like from the steering wheel (not shown) of the vehicle in the usual manner. A similar control valve generally designated by reference numeral 20 is provided for purposes of controlling the inclination or tilting spring system.

Both hydraulic systems are supplied from a common oil supply pump 21 of suitable construction which draws the oil from the reservoir 22 and forces the same under pressure into supply lines 23 and 26. The control valve 18 for the servo steering mechanism is connected in an oil circulating system including supply line 23 and discharge line 123. The oil pressure prevailing in the supply line 23 is adjustably controlled by the control valve 18 depending on the extent of displacement thereof by the steering movement at the steering wheel to provide a reduced pressure in the oil circulatory system including feed lines 24 and 24'. The oil circulatory system including lines 24 and 24' serves for purposes of actuation of the working piston 11 which is displaced by the oil pressure, depending on the position of the control valve 18 by a predetermined amount toward the right or left and thereby actuates the steering mechanism.

A second oil circulatory system including branch lines 25 and 25' is connected in parallel with the oil circulatory system of lines 24 and 24' so that lines 25 and 25' have the same pressure as lines 24 and 24', respectively, and serves for purposes of actuation of the control valve 20 of the inclination or tilting spring system. The working pressure which acts on the working piston 14 disposed in cylinder 14' is controlled by the control valve 20. The supply of the oil pressure to the working piston 14 takes place through an oil circulatory system including supply line 26 which is directly branched off from the outlet of pump 21, the control valve 20, and the feed line 26' or 26''. The working pressure prevailing in the system 26' and 26'' may be different from the pressure prevailing in the oil circulatory system 24 and 24' of the servo steering mechanism and is solely controlled by means of the control valve 20. A discharge line 126 leads back from control valve 20 to the reservoir or sump 22.

FIGURE 2 shows again the working piston 11 in cylinder 10 for the servo steering mechanism and the working piston 14 in cylinder 14' for the tilting or inclination spring system, the arrangement and construction of which is the same as described in connecton with FIGURE 1.

However, in the embodiment of FIGURE 2, the supply of the control valve 18 and of the control valve 20 takes place from two separate pumps 27 and 28. Both oil circulatory systems including supply and discharge line 29, 129 and 30, 130, respectively, are, therefore, completely independent and separate from each other. A further circulatory system including branch lines 31 and 31' is branched off in the manner described hereinabove from the oil circulatory system 29, 129 for the servo steering mechanism, and more particularly from the feed lines 24 and 24' thereof, respectively, which controls the control valve 20 in the manner described already in connection with FIGURE 1 by the pressure prevailing in the actuating portion of the servo steering system. Otherwise, the operation is the same as in FIGURE 1.

FIGURE 3 shows the internal construction of the system schematically illustrated in FIGURE 2. The pump 27 supplies oil pressure through line 29 to the cylinder space of the working cylinder 32 of the control valve 18 which cylinder 32 is connected with the piston rod 33 of the working piston 11 of the servo steering mechanism to achieve a control effect to be described more fully hereinafter.

The control slide valve member 34 is displaced by means of the piston rod 19 or another suitable linkage by the steering wheel. The control slide valve member 34 of spool-type construction is formed of two parts so as to control with the spools or piston parts thereof the feed lines 35 and 36 leading to the two sides of the working piston 11 in cylinder 10. The branch lines 31 and 31' are connected in parallel with the supply lines 35 and 36, the lines 31 and 31' constituting the control circulatory system for controlling the tilting or inclination spring system. The lines 31 and 31' are connected with a blocking or throttling member 37 which may be in the form of a speed-responsive slide valve member and which makes it possible to let the control arrangement for the tilting or inclination spring system become effective or responsive only after exceeding a predetermined minimum vehicle speed. The member 37 may thereby be connected with any conventional speed responsive means, such as a centrifugal governor, operatively connected with the driven wheels or shafts.

The lines 31 and 31' lead to the two sides of a control piston 38 which is arranged in the common housing 39 accommodating also the working piston 14 for the adjustment of the inclination or tilting spring system and a further control slide valve member 40. The control piston 38 is maintained in the center position thereof by two springs 41 and 42, the force of which may be adjusted, for example, by using various size washers such as washers 41' and 42'. For reasons of simplicity and ease of manufacture, the control piston 38 may be made of two parts and may be connected by means of piston rod 43 thereof with a scale-beam-like intermediate linkage 44.

The piston rod 15 of the working piston 14 for the adjustment of the inclination or tilting spring system and the piston rod 45 of the control slide valve member 40 are both operatively connected with the same scale-beam-like intermediate link 44. Also, the position of the piston rods 15, 43 and 45 with respect to the scale-beam-like intermediate linkage 44 may be constructed to be adjustable. For example, the point of attack 46 of the piston rod 43 of the control piston 38 may be adjusted or displaced within an eccentric opening or slot arrangement as illustrated schematically in FIGURE 3, by opening 46'.

The second control valve member 40 serves for purposes of adjusting the pressure for the working piston 14. The second control valve member 40 is constructed as a throttling control member and consists of three piston parts or spools 47, 48 and 49. The center piston part or spool 48 thereby controls the supply line 50 supplying oil under pressure from the pump 28. The two lateral piston parts or spools 47 and 49 control the return flow of the oil through discharge line 51 to the tank or reservoir 22. Lines 54 and 55 lead from the two control spaces 52 and 53 formed intermediate the piston parts or spools 47, 48 and 49, respectively, to the two sides of the working piston 14 for the servo tilting spring system. A spring 57 arranged in the adjoining housing 56 or the like is coordinated to the working piston 14 which spring 57 always retains the piston rod 15 and therewith the working piston 14 in the center position thereof by means of abutment plates 58 and 59 secured to the piston rod 15 if no pressure exists in the oil circuit systems so that no unnecessary or displeasing inclination of the vehicle body may occur.

Operation

The operation of the system of FIGURE 3 is as follows:

If the steering wheel (not shown) is actuated, then a displacement of the control slide valve member 34 takes place by means of the piston rod 19, for example, toward the right. As a result of the displacement toward the right of the control slide valve member 34, the inlet or supply line 36 is placed into communication or connected with the pump 27 operating at a constant pressure and the working piston 11 of the servo steering mechanism is subjected on the left side thereof to pressure. Consequently, the working piston 11 moves toward the right and thereby simultaneously therewith displaces the cylinder 32 for the control of the servo steering mechanism toward the right until the latter, after a predetermined stroke or movement thereof, again assumes the same position with respect to the control valve member 34 as it occupied during the initiation of the control movement whereupon the oil supply to the supply line 36 is again blocked off. The steering system therewith possesses a predetermined steering movement, i.e., rotation of the steerable wheels, which is maintained as long as no further displacement of the control slide valve member 34 in the same or opposite direction is initiated by the piston rod 19 thereof.

Simultaneously, with the supply of oil under pressure to feed line 36, the left side of the control slide valve member 38 is also supplied with oil under pressure from the pump 27 over line 31'.

The control valve member 38 thereby moves toward the left as a result of the oil pressure in line 31', whereby the spring 41 is compressed. By means of the intermediate linkage 44, the control valve member 40 is also displaced toward the left. Consequently, the control valve member 40 throttles the inflowing oil pressure from pump 28 flowing in through line 50 in such a manner that different pressures occur in the cylinder spaces 52 and 53 which build up by means of the fluid supplied through lines 54 and 55 on the two sides of the working piston 14. In the case of the aforedescribed example, the cylinder space 53 receives the pressure build-up so that the pressure on the right-hand side of the working piston 14 is increased by means of the fluid supplied through line 55 while the pressure on the left-hand side thereof is reduced by means of fluid removed through line 54. Consequently, the working piston 14 is also displaced toward the left and therewith displaces by means of piston rod 15 the tilting or inclination spring system in the desired manner.

Upon the displacement of the piston rod 15, the control slide valve member 40 is again returned to its initial or zero position by the intermediate linkage 44 since the point of rotation 46 is maintained relatively stationary by the control slide valve member 38. The further supply of oil pressure to the working piston 14 is thereby interrupted and ceases. Consequently, every position of the control valve slide member 38 corresponds to a predetermined adjustment of the tilting or inclination spring system which is thereby independent of the steering force. The return of both systems to the zero positions thereof, therefore, takes place correspondingly in the reverse sequence.

FIGURE 4 shows a modified embodiment which, in principle, operates in a similar manner in which, however, a common pump 28 is used for the supply of both circulatory systems. The control of the servo steering mechanism in that case is also constructed as a throttling control arrangement. The discharge line 51 of the control valve assembly 39 for the tilting spring system is now supplied as supply line to the throttling piston 60 of the servo steering mechanism. The latter, in principle, has an analogous construction as control valve member 40 in FIGURE 3. However, the return or discharge line 63 thereof to the reservoir 22 is controlled by the two outer piston parts or spools 61 and 62.

Operation

The operation of the embodiment of FIGURE 4 is, in principle, the same as that described in connection with FIGURE 3. However, the two control systems are now connected in series behind each other and are supplied from the same pump 28 operating with a constant output quantity. The control slide valve member 60 thereby automatically adjusts directly, in dependence on the extent of the steering movement at the steering wheel, the pressure difference required for the two sides of the working pistons 11 (not shown) while the control slide valve 40 automatically adjusts the pressure difference indirectly on the two sides of the working piston 14 (not shown).

While I have shown and described several embodiments in accordance with the present invention, it is understood that the same is not limited thereto but is susceptible of many changes and modifications within the spirit and scope of the present invention, and I, therefore, intend to cover all such changes and modifications as encompassed by the appended claims.

I claim:

1. An installation for a curve stabilization system of a vehicle having a steering system and an anti-tilt spring system, comprising force circuit means for each of said systems, power means producing a force and supplying the same to each of said force circuit means, first actuating means in one of said force circuit means for actuating said steering system with the aid of said force, second actuating means in the other of said force circuit means for actuating said spring system with the aid of said force, and control means for controlling said other force circuit means by said one force circuit means, each of said actuating means including a double-acting working piston, and said second actuating means also including two slide valve members and intermediate scale-beam-like linkage means operatively connecting the working piston of said anti-tilt spring system with said two slide valve members.

2. An installation for a curve stabilization system according to claim 1, wherein one of said slide valve members is constituted by a double-acting slide valve member providing two working spaces, and line means connecting said two working spaces with respective sides of the working piston of said steering system.

3. An installation for a curve stabilization system according to claim 2, further comprising spring means for said double-acting slide valve member and means for adjusting the force of said spring means.

4. An installation for a curve stabilization system according to claim 1, wherein one of said slide valve members is a throttling control valve member having three piston portions, the center piston portion thereof controlling the inlet from said power means, and the two outer piston portions thereof controlling the discharge of said force.

5. An installation for a curve stabilization system according to claim 4, further comprising line means connecting the two working spaces formed intermediate a respective outer piston portion and said center piston portion with a respective side of the working piston of said anti-tilt spring system.

6. An installation for a curve stabilization system according to claim 1, wherein the point of attack on said linkage means of the center one of the parts consisting of said double-acting piston and of said slide valve members is adjustable.

7. An installation for a curve stabilization system according to claim 1, wherein said steering system includes throttling control means provided with an input and a discharge line, wherein said power means includes an output side, and wherein one of said slide valve members constitutes a throttling member having input means connected to said output side and output means connected to said input.

References Cited in the file of this patent

UNITED STATES PATENTS

| | | |
|---|---|---|
| 2,008,769 | Parsons | July 23, 1935 |
| 2,802,674 | Jackson | Aug. 13, 1957 |
| 2,804,311 | Pobanz | Aug. 27, 1957 |

FOREIGN PATENTS

| | | |
|---|---|---|
| D20,741 | Germany | Dec. 20, 1956 |

(Printed App.)